US010038813B2

(12) United States Patent
Minami

(10) Patent No.: US 10,038,813 B2
(45) Date of Patent: Jul. 31, 2018

(54) INFORMATION PROCESSING SYSTEM AND INFORMATION PROCESSING METHOD

(71) Applicant: Kohichiroh Minami, Kanagawa (JP)

(72) Inventor: Kohichiroh Minami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/452,087

(22) Filed: Mar. 7, 2017

(65) Prior Publication Data

US 2017/0264776 A1  Sep. 14, 2017

(30) Foreign Application Priority Data

Mar. 10, 2016 (JP) ................. 2016-046529

(51) Int. Cl.
*H04N 1/32* (2006.01)
*H04N 1/00* (2006.01)

(52) U.S. Cl.
CPC ..... *H04N 1/32144* (2013.01); *H04N 1/00037* (2013.01); *H04N 1/00344* (2013.01); *H04N 1/00803* (2013.01); *H04N 2201/0094* (2013.01); *H04N 2201/3249* (2013.01)

(58) Field of Classification Search
CPC .. G06Q 10/00; G06Q 50/22; G06F 17/30017; G06F 17/30268; G06F 17/30274; G06F 17/3028; G06F 17/30781; G06F 3/04842; H04L 29/06; H04L 29/06027; H04L 69/329; H04N 1/00342; H04N 1/4413; H04N 1/44
USPC ...................... 358/1.1, 1.15; 600/300; 705/2; 707/722, 941, 999.2; 715/810
See application file for complete search history.

(56) References Cited

U.S. PATENT DOCUMENTS

| | | | |
|---|---|---|---|
| 7,884,972 B2 * | 2/2011 | Morikawa | H04N 1/00347 358/1.16 |
| 8,095,541 B2 | 1/2012 | Uchida | |
| 8,810,815 B2 * | 8/2014 | Kishida | H04N 1/00344 358/1.13 |
| 8,953,191 B2 | 2/2015 | Fukuda | |

(Continued)

FOREIGN PATENT DOCUMENTS

| | | |
|---|---|---|
| JP | 2009-271919 | 11/2009 |
| JP | 2012-168982 | 9/2012 |

*Primary Examiner* — Negussie Worku
(74) *Attorney, Agent, or Firm* — Oblon, McClelland, Maier & Neustadt, L.L.P.

(57) ABSTRACT

An information processing system includes an image processing apparatus and a server device, the image processing apparatus including: a read controller that reads a recording medium on which a first image is formed and in which identifying information of the first image is embedded and generates a second image; a detector that detects the embedded identifying information from the second image; and a first transmitter that transmits the detected identifying information and the second image to the server device, the server device including: a storage that stores an image and identifying information of the image in association with each other; a determining unit that determines whether the transmitted identifying information is stored in the storage unit; and a storage controller that, when it is determined that the transmitted identifying information is stored in the storage unit, stores the transmitted second image in association with the stored identifying information.

9 Claims, 10 Drawing Sheets

(56) References Cited

U.S. PATENT DOCUMENTS

| | | | |
|---|---|---|---|
| 9,209,975 B2 | 12/2015 | Uchida et al. | |
| 9,576,272 B2* | 2/2017 | Macciola | G06Q 10/10 |
| 2002/0039115 A1* | 4/2002 | Kawashima | H04L 29/06 |
| | | | 715/810 |
| 2005/0223045 A1* | 10/2005 | Funahashi | G06Q 50/22 |
| 2008/0231889 A1* | 9/2008 | Morohoshi | H04N 1/00342 |
| | | | 358/1.15 |
| 2009/0125472 A1* | 5/2009 | Houchi | G06F 17/30011 |
| | | | 706/50 |
| 2009/0202550 A1* | 8/2009 | Resnati | C07K 16/2896 |
| | | | 424/139.1 |
| 2011/0317223 A1* | 12/2011 | Nagao | H04N 1/00347 |
| | | | 358/442 |
| 2014/0365552 A1* | 12/2014 | Sano | G06F 17/30241 |
| | | | 709/202 |
| 2015/0220817 A1* | 8/2015 | Kujirai | G06K 15/021 |
| | | | 358/1.15 |
| 2015/0324640 A1* | 11/2015 | Macciola | G06Q 10/10 |
| | | | 382/112 |
| 2016/0203264 A1* | 7/2016 | Danner | G06F 19/321 |
| | | | 382/128 |
| 2016/0295033 A1* | 10/2016 | Hirasawa | H04N 1/0097 |
| 2016/0379487 A1* | 12/2016 | Voeller | H04N 5/232 |
| | | | 340/937 |
| 2017/0139925 A1* | 5/2017 | Shah | G06F 17/30056 |
| 2017/0235768 A1* | 8/2017 | Amrutkar | G06F 17/30268 |
| | | | 707/722 |

* cited by examiner

FIG.8

| DOCUMENT ID | USER NAME | TIME OF CREATION | DOCUMENT NAME | APPLICATION | IMAGE FORMAT | COLOR | SIZE | TAG |
|---|---|---|---|---|---|---|---|---|
| 1234567890 | USER A | 2015/9/28 10:05 | Doc1 | COPY | JPEG | COLOR | 4096 KB | |
| 1235333333 | USER B | 2015/9/28 15:15 | REGULAR MINUTES 23 | PRINTER | TIFF | MONO-CHROME | 1028 KB | MINUTES, USER B |
| 2020101013 | USER C | 2015/9/30 12:48 | Scan1 | SCANNER | JPEG | COLOR | 2002 KB | |
| 3213213210 | USER A | 2015/9/30 18:41 | MEETING HANDOUT_A | SCANNER | TIFF | COLOR | 8848 KB | CONFIDENTIAL |
| 4564564564 | USER D | 2015/10/5 11:30 | REGULAR MINUTES 24 | PRINTER | TIFF | MONO-CHROME | 1030 KB | MINUTES |

FIG.10

To: AAA@hoge.co.jp
Cc:
SENDER: MFP002

● CREATED DOCUMENT
☐ DOCUMENT NAME: 4th MINUTES   CREATOR: AAA

================================
● RELATIVE DOCUMENT
☐ DOCUMENT NAME: 1st MINUTES   CREATOR: AAA
☐ DOCUMENT NAME: 2nd MINUTES   CREATOR: AAA
☐ DOCUMENT NAME: 3rd MINUTES   CREATOR: BBB

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2016-046529, filed Mar. 10, 2016. The contents of which are incorporated herein by reference in their entirety.

BACKGROUND OF THE INVENTION

1. Field of the Invention

The present invention relates to an information processing system and an information processing method.

2. Description of the Related Art

A technology in which information is embedded in an image by digital watermarking is known. Furthermore, a technology in which, when a printed document is corrected by handwriting and is re-scanned, image data in a file server is chosen and updated has been proposed.

For example, Japanese Unexamined Patent Application Publication No. 2012-168982 proposes a technology of implementing access to a document management system according to an operation on an image processing apparatus and, in order to complete a document editing work, choosing and printing a document that is to check out and rescanning the document to cause the document to check in.

The conventional technology however has a problem in that, when one of multiple documents is updated, a user has to choose the document to be updated.

In view of the above-described circumstances, there is a need to reduce the processing load of updating information.

SUMMARY OF THE INVENTION

According to exemplary embodiments of the present invention, there is provided an information processing system comprising an image processing apparatus and a server device, the image processing apparatus comprising: a read controller configured to read a recording medium on which a first image is formed and in which identifying information of the first image is embedded and generate a second image; a detector configured to detect the embedded identifying information from the second image; and a first transmitter configured to transmit the detected identifying information and the second image to the server device, the server device comprising: a storage configured to store an image and identifying information of the image in association with each other; a determining unit configured to determine whether the transmitted identifying information is stored in the storage unit; and a storage controller configured to, when it is determined that the transmitted identifying information is stored in the storage unit, store the transmitted second image in association with the stored identifying information.

Exemplary embodiments of the present invention also provide an information processing method comprising: by an image processing apparatus, reading a recording medium on which a first image is formed and in which identifying information of the first image is embedded and generating a second image; by the image processing apparatus, detecting the embedded identifying information from the second image; by the image processing apparatus, transmitting the detected identifying information and the second image to a server device; by the server device, determining whether the transmitted identifying information is stored in a storage unit that stores an image and identifying information of the image in association with each other; by the server device, when it is determined that the transmitted identifying information is stored in the storage unit, storing the transmitted second image in association with the stored identifying information.

BRIEF DESCRIPTION OF THE DRAWINGS

FIG. 8 is a diagram of exemplary meta data;

FIG. 10 is a diagram of an exemplary mail to be distributed; and

The accompanying drawings are intended to depict exemplary embodiments of the present invention and should not be interpreted to limit the scope thereof. Identical or similar reference numerals designate identical or similar components throughout the various drawings.

DESCRIPTION ACCORDING TO THE EMBODIMENTS

Figure 1:
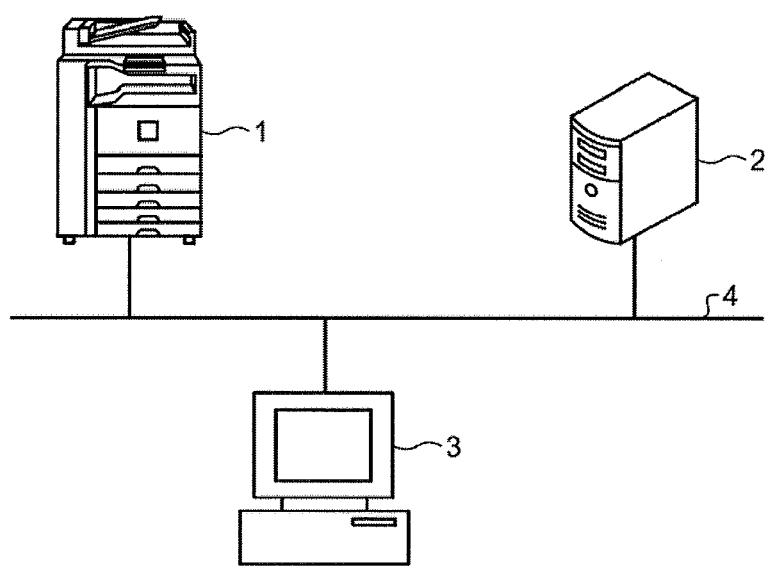
FIG. 1 is a diagram of an exemplary configuration of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the information processing system and the information processing method according to the present invention will be described in detail below with reference to the accompanying drawings.

In an information processing system according to the embodiment, information that identifies a document (image)

(identifying information) is embedded in the document (image) by, for example, digital watermarking and an image is printed. When the printed image is corrected by handwriting and the image is re-scanned, the identifying information is detected and, when the detected identifying information is already stored in the server device, the image corresponding to the already-stored identifying information is updated with the re-scanned image. Accordingly, the user does not need to perform an operation of, for example, choosing a document to be updated, which makes it possible to reduce the processing load of updating information. According to the embodiment, an image relating to the updated image is further distributed. Accordingly, for example, when the minutes or handout of a meeting is re-scanned, it is possible to distribute a relevant document.

FIG. 1 is a diagram of an exemplary configuration of an information processing system according to the embodiment. As illustrated in FIG. 1, the information processing system has a configuration in which an image processing apparatus 1, a server device 2 and a personal computer (PC) 3 are connected via a network 4.

The network 4 may be in any network mode. For example, the network 4 includes a local area network (LAN) and the Internet. The network 4 may be any one of a wired network, a wireless network, and a network in which there are both a wired network and a wireless network.

The image processing apparatus 1 is an image forming apparatus (multifunction peripheral) including, for example, a copy function, a printer function, a scanner function and a facsimile function. It is satisfactory if the image processing apparatus 1 includes at least a function of printing an image and a function of reading an image. The image processing apparatus 1 includes a function of embedding a digital watermark and performing printing (forming an image), a function of detecting the embedded digital watermark when reading the image, and a function of transmitting the image to, for example, the server device 2.

The server device 2, for example, saves an image and meta data, specifies an image, searches for a relevant image, and distributes the relevant image. The PC 3 is, for example, used as a destination to which the relevant image is distributed.

Figure 2:
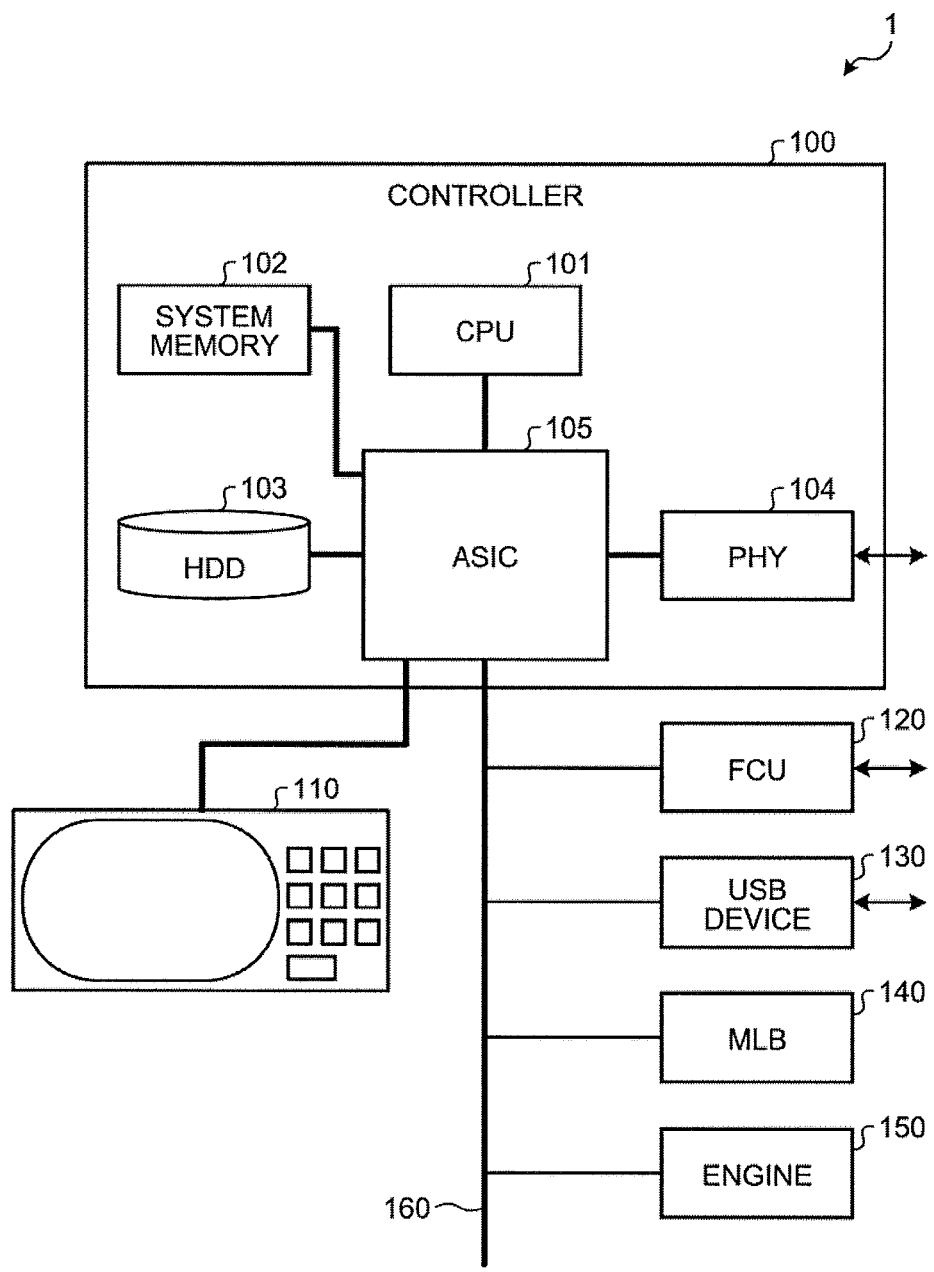
FIG. 2 is a block diagram of an exemplary hardware configuration of an image processing apparatus according to the embodiment.

FIG. 2 is a block diagram of an exemplary hardware configuration of the image processing apparatus 1 according to the embodiment. The image processing apparatus 1 according to the embodiment includes, for example, as illustrated in FIG. 2, a controller 100, an operation panel 110, a facsimile control unit (FCU) 120, a universal serial bus (USB) device 130, a media link board (MLB) 140 and an engine 150.

The operation panel 110 is a user interface via which an operator issues instructions to execute various jobs or inputs settings or that displays various types of information to be represented to the operator. The FCU 120 is a control unit that controls the facsimile function of the image processing apparatus 1. The USE device 130 is a device that is connected to the image processing apparatus 1 according to the USE. The MLB 140 is a conversion board that performs format conversion of image data. The engine 150 includes, for example, a scanner engine that reads an image and a plotter engine that performs printing.

The controller 100 is a control device that controls operations of the image processing apparatus 1. As illustrated in FIG. 2, the controller 100 includes a central processing unit (CPU) 101, a system memory 102, a hard disk drive (HDD) 103, a physical layer (PHY) 104 and an application specific integrated circuit (ASIC) 105. The operation panel 110 is connected to the ASIC 105 of the controller 100. The PHY 104, for example, converts a logical signal into a practical electric signal according to an interface, such as Ethernet (trademark). The FCU 120, the USB device 130, the MLB 140 and the engine 150 are connected to the ASIC 105 of the controller 100 via a data transfer bus 160.

Various types of operation control performed by the image processing apparatus 1 are implemented by using various types of software that are executed by the CPU 101 of the controller 100. The CPU 101 starts various types of software belonging to a control service layer of a software group and various types of software belonging to a handler layer, which will be described below, on an operating system (OS) as processes, respectively, and executes them, thereby controlling various operations of the image processing apparatus 1.

Figure 3:
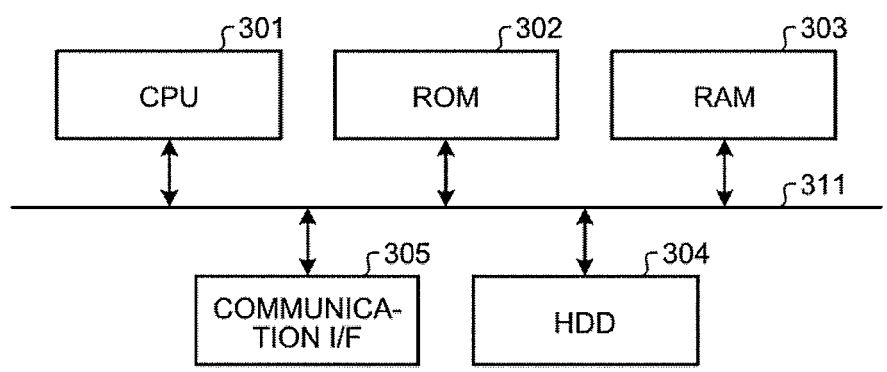
FIG. 3 is an explanatory view of an exemplary hardware configuration of a server device and a PC according to the embodiment.

The hardware configuration of the server device 2 and the PC 3 according to the embodiment will be described with reference to FIG. 3. FIG. 3 is an explanatory view of an exemplary hardware configuration of the server device 2 and the PC 3 according to the embodiment.

Each of the server device 2 and the PC 3 according to the embodiment includes a control device including a CPU 301; a storage device including a read only memory (ROM) 302, a random access memory (RAM) 303, and a HDD 304; a communication I/F 305 that is connected to a network to perform communications; and a bus 311 that connect various components.

Figure 4:
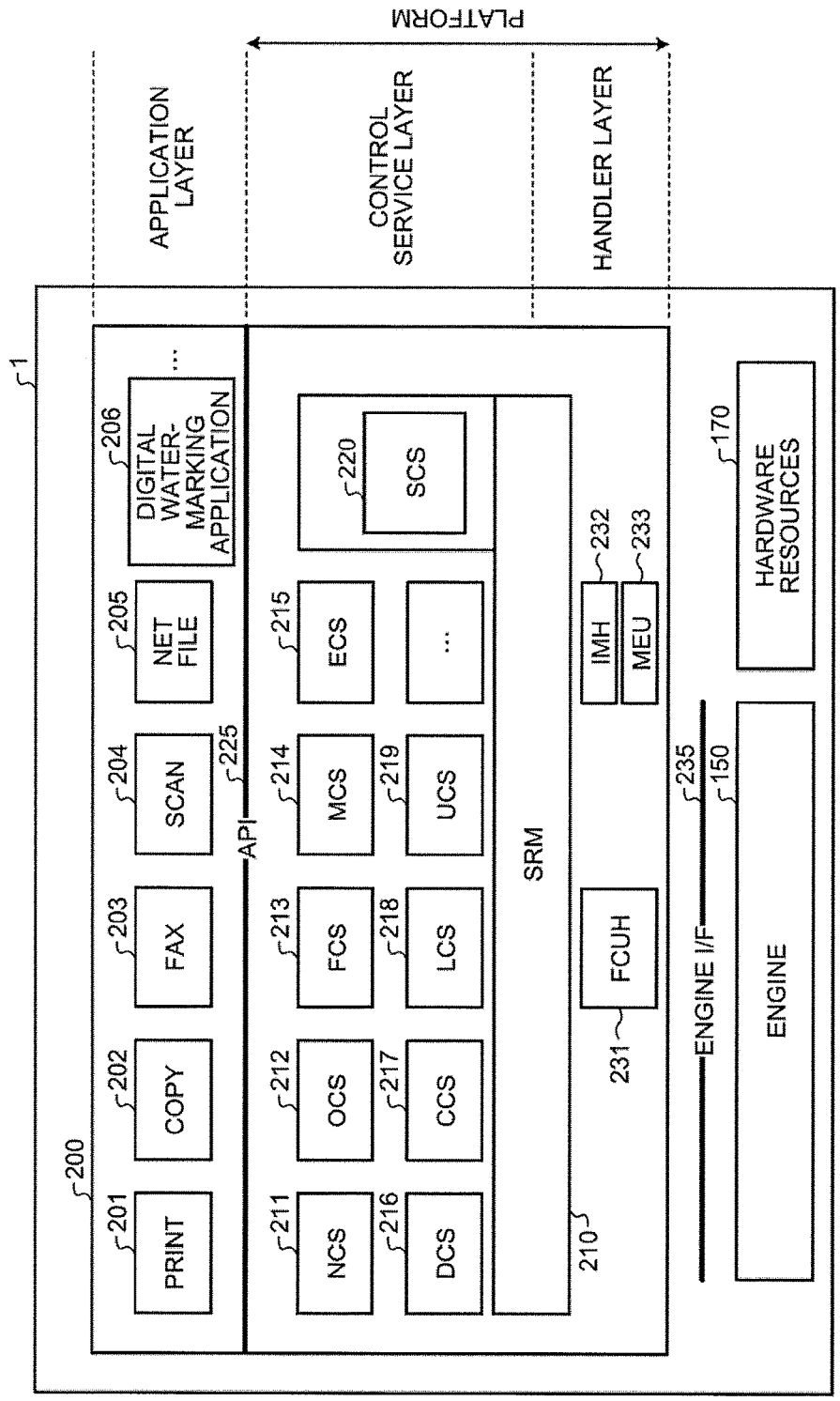
FIG. 4 is a block diagram of an exemplary software configuration of the image processing apparatus according to the embodiment.

An exemplary software configuration of the image processing apparatus 1 will be described. FIG. 4 is a block diagram of an exemplary software configuration of the image processing apparatus 1 according to the embodiment. The image processing apparatus 1 includes, for example, as illustrated in FIG. 4, a software group 200 for implementing various operations by using the engine 150 and hardware resources 170. The software group 200 includes the application layer and a platform that are started on the OS, such as UNIX (trademark). The hardware resources 170 are hardware resources (such as the ASIC 105 that communicates data with the engine 150) illustrated in FIG. 2 other than the engine 150.

The application layer contains a program for performing processes unique to user services relating to image formation, such as PRINT (a printer application) 201, COPY (a copy application) 202, FAX (a facsimile application) 203, SCAN (a scanner application) 204, NET FILE (file storage application) 205, and a digital watermarking application 206.

The platform includes a control service layer that translates a process request from the application layer and generates a request to acquire the hardware resource 170, a system resource manager (SRM) 210 that adjusts the acquisition request from the control service layer by managing at least one of the hardware resources 170, and the handler layer that manages the hardware resources 170 according to the acquisition request from the SRM 210. The platform is configured to include an API 225 that is able to receive the process request from the application layer by using a predefined function. The OS executes the sets of software of the application layer and the platform as processes in parallel.

The control service layer is configured to include at least one service module, such as a network control service (NCS) 211, an operation panel control service (OCS) 212, a facsimile control service (FCS) 213, a memory control service (MCS) 214, an engine control service (ECS) 215, a delivery control service (DCS) 216, a certification and charge control service (CCS) 217, a log control service (LCS) 218, a user information control service (UCS) 219, and a system control service (SCS) 220.

The process of the NCS 211 provides commonly usable services to applications that require a network I/O. The process of the NCS 211, for example, allocates sets of data received according to protocols, respectively, from the network and serves as an intermediary of transmission of data from each application to the network. The process of the FCS 213 provides the API for facsimile transmission and reception using the PSTN or the ISDN to and from the application layer, registration/quotation of various types of facsimile data that is managed in a backup memory, facsimile reading, and facsimile receiving and printing.

The process of the MCS 214 performs memory control to, for example, acquire and free the system memory 102 and use the HDD 103. The process of the ECS 215 controls the engine unit containing the engine 150 and the hardware resources 170. The process of the DCS 216 controls distribution of stored documents. The process of the CCS 217 controls certification and charging. The process of the LCS 218 manages and stores log information. The process of the UCS 219 manages user information. The process of the SCS 220 performs processes of, for example, application management, operator control, system screen display, LED display, hardware resource management and interrupt application control.

The process of the SRM 210 controls the system and the hardware resources 170 together with the SCS 220. For example, the process of the SRM 210 makes an adjustment according to the acquisition request from the upper layer using the plotter contained in the engine 150 or the hardware resources 170 and executes control. Specifically, the process of the SRM 210 determines whether the hardware resource 170 requested to be acquired is usable (whether the hardware resource 170 is not used according to another acquisition request) and, when the hardware resource 170 is usable, makes a notification indicating that the hardware resource 170 requested to be acquired is usable to the upper layer. The process of the SRM 210 performs scheduling for using the hardware resources 170 according to the acquisition requests from the upper layer and directly implements the content of the requests (such as paper conveyance and image formation operations performed by the printer engine, leaving a free memory, and file generation).

The handler layer includes a facsimile control unit handler (FCUH) 231, an image memory handler (IMH) 232, and a media edit utility (MEU) 233. The FCUH 231 manages the FCU 120 that is contained in the hardware resources 170. The IMH 232 manages allocation of the memory to the processes and the memory allocated to the processes. The MEU 233 controls the MLB 140 contained in the hardware resources 170. The SRM 210 and the FCUH 231 makes a process request to the hardware resource 170 by using an engine I/F 235 that is able to transmit the process request to the hardware resource 170 according to a pre-defined function.

Figure 5:
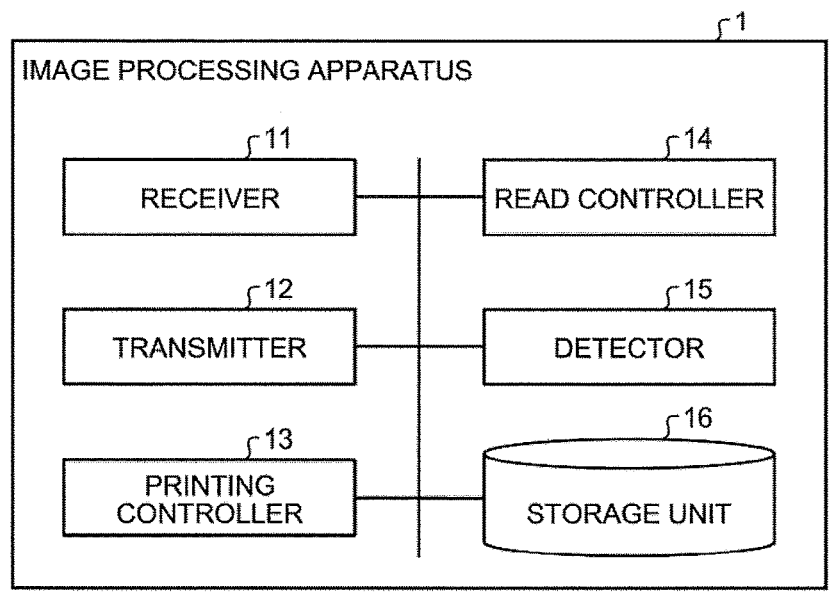
FIG. 5 is a block diagram of an exemplary functional configuration of the image processing apparatus.

The functional configuration of the image processing apparatus 1 will be described. FIG. 5 is a block diagram of an exemplary functional configuration of the image processing apparatus 1. As illustrated in FIG. 5, the image processing apparatus 1 includes a receiver 11, a transmitter 12, a printing controller 13, a read controller 14, a detector 15, and a storage unit 16.

The receiver 11 receives various types of information from an external device, such as the server device 2. The transmitter 12 transmits various types of information to the external device. For example, the transmitter 12 transmits identifying information that is detected by the detector 15 from an image (first image) and an image that is read by the read controller 14 (second image) to the server device 2. The receiver 11 and the transmitter 12 are, for example, implemented by the NCS 211 represented in FIG. 4.

The printing controller 13 controls printing on recording media, such as paper. The printing controller 13 includes a function of embedding identifying information of an image in the image by using, for example, digital watermarking and printing the image. The printing controller 13 is implemented by using PRINT 201, the digital watermarking application 206, and the functions of the control service layer relating to printing that are illustrated in FIG. 4.

The read controller 14 controls a process of reading an image from a recording medium. For example, the read controller 14 reads the recording medium on which the image (first image) is formed and in which the identifying information of the formed image is embedded and generates and outputs the read image (second image). The read controller 14 is implemented by using SCAN 204 and the functions of the control service layer that relate to reading.

The detector 15 detects the embedded identifying information from the image that is read by the read controller 14. The detector 15 is implemented by, for example, SCAN 204 represented in FIG. 4.

The storage unit 16 stores various types of information that are used in the processes performed by the image processing apparatus 1. The storage unit 16 is implemented by, for example, the system memory 102 and the HDD 103 represented in FIG. 2.

The components of the image processing apparatus 1 (such as the receiver 11, the transmitter 12, the printing controller 13, the read controller 14 and the detector 15) may be implemented by causing a processing device, such as the CPU 101, to execute a program, i.e., by using software, may be implemented by using hardware, such as an integrated circuit (IC), or may be implemented by using both software and hardware.

Figure 6:
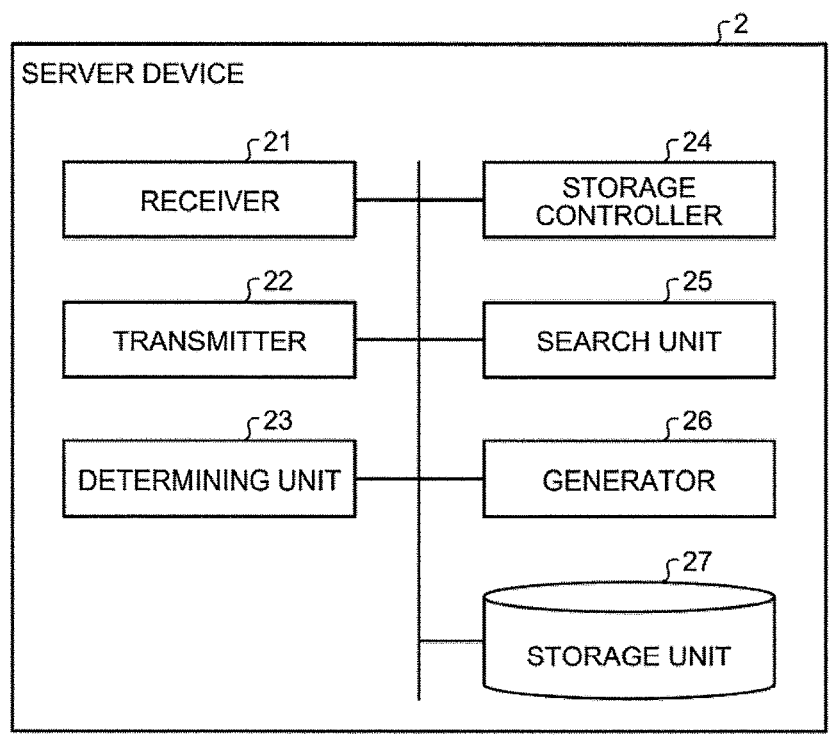
FIG. 6 is a block diagram of an exemplary functional configuration of a server device.

The functional configuration of the server device 2 will be described. FIG. 6 is a block diagram of an exemplary functional configuration of the server device 2. As illustrated in FIG. 6, the server device 2 includes a receiver 21, a transmitter 22, a determining unit 23, a storage controller 24, a search unit 25, a generator 26 and a storage unit 27.

The storage unit 27 stores various types of information that are used in processes performed by the server device 2. For example, the storage unit 27 stores an image and identifying information of the image in association with each other. The storage unit 27 is implemented by, for example, the ROM 302, the RAM 303 and the HDD 304 represented in FIG. 3.

The receiver 21 receives various types of information from an external device, such as the image processing apparatus 1. The transmitter 22 transmits various types of information to the external device. For example, the transmitter 22 transmits (distributes) an image (relative image) relating to the image stored in the storage unit 27 in association with the identifying information that is transmitted from the image processing apparatus 1.

The transmitter 22 may distribute the relative image or distribute information for accessing the relative image. The transmitter 22 may be configured to transmit the relative image to at least one transmission destination that is determined according to the relative image. For example, not only the user who has executed printing or rescanning but also other users who participated in a meeting together with the user may be registered in association with the relative image in advance and distribute the relative image to the registered users who are regarded as transmission destinations. The transmitter 22 may transmit the relative image for which the user that is the transmission destination has access authority to the user. Accordingly, it is possible to prevent a user who does not have authority to view a document from accessing the document.

The determining unit 23 determines whether the identifying information that is transmitted from, for example, the image processing apparatus 1 is stored in the storage unit 27.

The storage controller 24 controls writing of information in the storage unit 27 and reading of information from the storage unit 27. For example, when the determining unit 23 determines that the identifying information is stored in the storage unit 27, the storage controller 24 stores the image that is transmitted from the image processing apparatus 1 in association with the stored identifying information. The storage controller 24 may replace the image associated with the identifying information with the transmitted image. In other words, the storage controller 24 may delete the image that is associated with the identifying information and newly associates the transmitted image with the identifying information. The storage controller 24 may additionally associate the transmitted image with the identifying information without deleting the already-associated image. This allows the user to check the log of change between images.

The search unit 25 searches for a document (relative image) relating to a document (image). For example, the search unit 25 refers to the meta data of images that is stored in the storage unit 27 and searches for a document relating to a document in the storage unit 27. The details of the meta data will be described below.

The generator 26 generates information to be distributed by the transmitter 22. For example, the generator 26 generates a mail containing at least one of link information representing a link of the relative image and positional information representing the position in which the relative image is stored.

The components of the server device 2 (the receiver 21, the transmitter 22, the determining unit 23, the storage controller 24, the search unit 25 and the generator 26) may be implemented by causing a processing device, such as the CPU 301, to execute a program, i.e., by using software, may be implemented by using hardware, such as an IC, or may be implemented by using both software and hardware.

Figure 7:
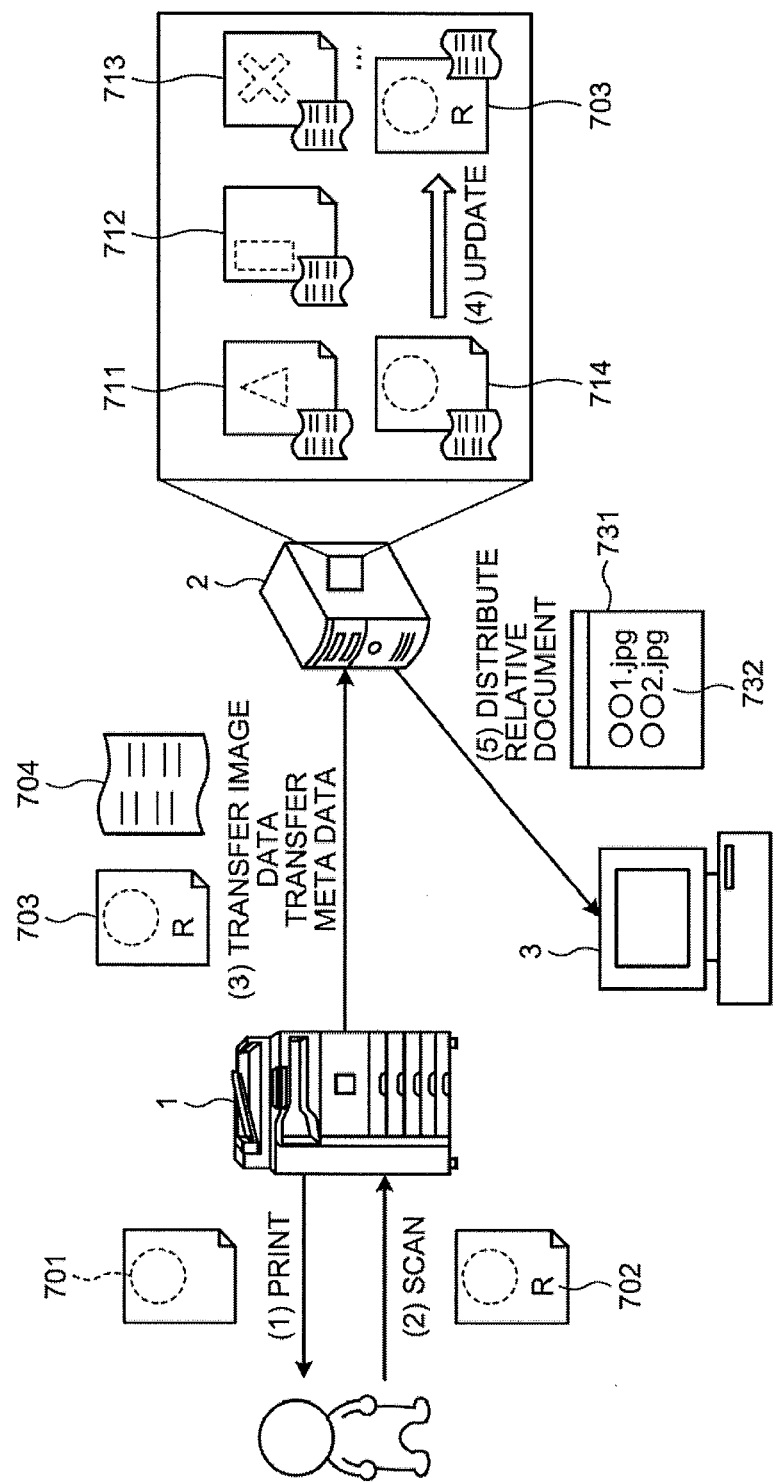
FIG. 7 is a diagram illustrating an overview of a flow of information that is processed by the information processing system.

The flow of information processed by the information processing system according to the embodiment will be described. FIG. 7 is a diagram illustrating an overview of the flow of information processed by the information processing system.

(1) When a user makes a print instruction to the image processing apparatus 1, the image processing apparatus 1 prints an image in which a digital watermark 701 is embedded. Identifying information of a document is embedded in the digital watermark.

(2) After the user adds a correction 702 by handwriting to the printed recording medium, the image processing apparatus 1 reads the recording medium.

(3) The image processing apparatus 1 reads the information of the digital watermark (identifying information) from a read image 703 and adds the information to meta data 704 of the image. The image processing apparatus 1 transfers the image 703 and the meta data 704 to the server device 2. The image and the meta data are, for example, associated with each other one-on-one.

(4) The server device 2 refers to the identifying information contained in the meta data and specifies the same image as the transferred image from the images (images 711 to 714) saved in the server device 2. For example, when the image 714 is specified, the server device 2 updates the image 714 with the new image 703.

(5) The server device 2 creates the updated image and a link 732 to the updated image and the link 732 to a relative image relating to the image and distributes the link 732 by using a mail 731.

A specific example of the meta data will be described. FIG. 8 is a diagram of exemplary meta data. Each row of the table of FIG. 8 represents meta data on one image. The meta data contains a document ID, a user name, a time of creation, a document name, an application, an image form, a color, a size and a tag. The document ID is exemplary identifying information that identifies an image. Unique document IDs are allocated to images that are generated by the image processing apparatus 1.

As illustrated in FIG. 8, the meta data contains, in addition to a document ID, attributes of the image, such as a user name, a time of creation, a document name, an application, an image form, a color and a size. The meta data further contains a tag. A tag is, for example, information representing a document relating to the image (relative image). By referring to the tag, the search unit 25 is able to search for a document that relates to a document (image). A configuration in which multiple tags are given to one document may be used. The tag may be changeable.

Figure 9:
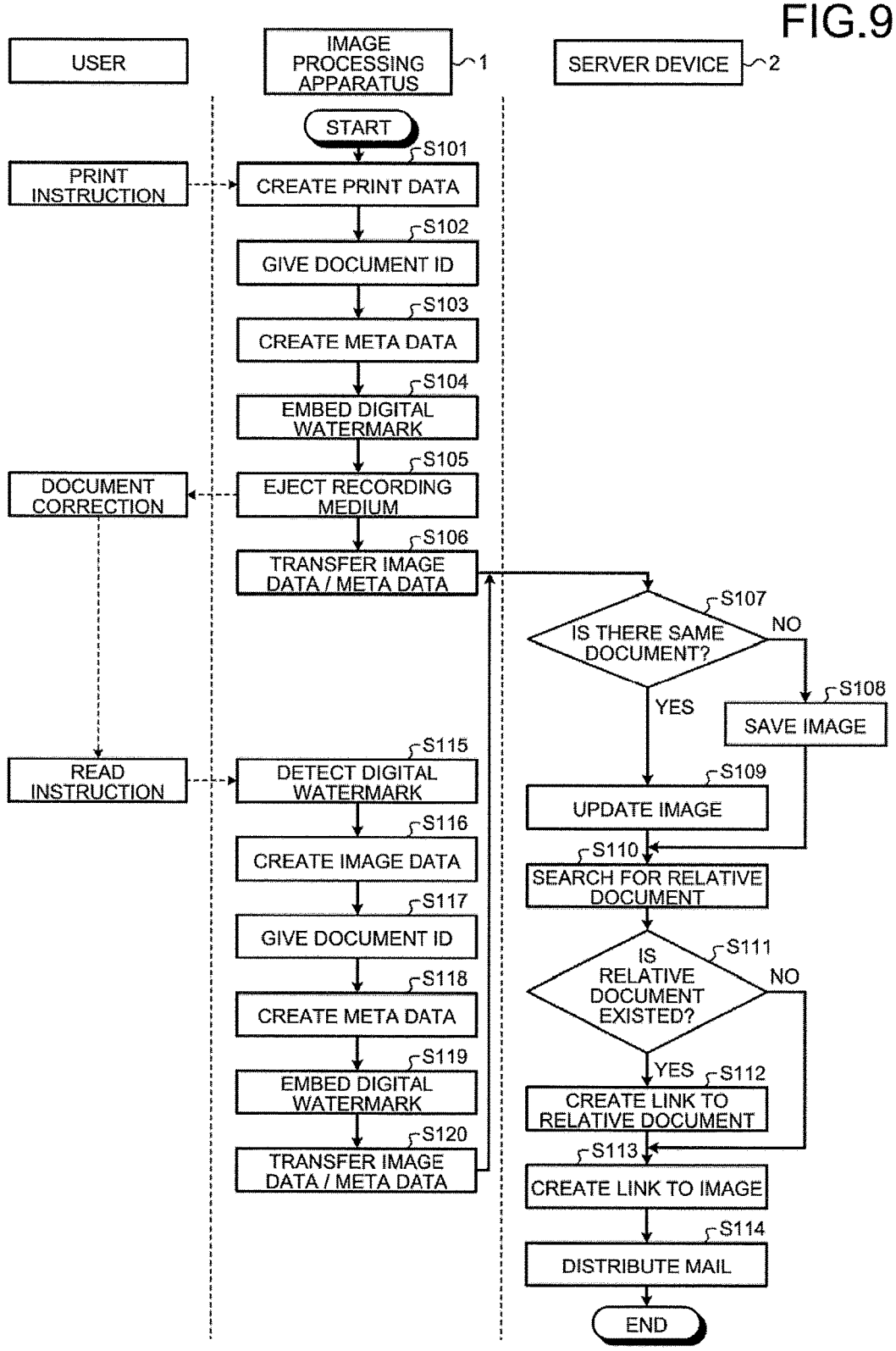
FIG. 9 is a sequence chart of an exemplary document registration and distribution process according to the embodiment.

An exemplary document registration and distribution process performed by the information processing system according to the embodiment will be described with reference to FIG. 9. FIG. 9 is a sequence chart of the exemplary document registration and distribution process according to the embodiment.

On receiving an instruction to print a document from a user, the printing controller 13 of the image processing apparatus 1 creates a document image (image data) (step S101). The printing controller 13 gives a document ID to the document (step S102). The printing controller 13 creates meta data like one illustrated in FIG. 8 (step S103). The printing controller 13 embeds the document ID in the image as information of a digital watermark (step S104). The printing controller 13 prints the image in which the document ID is embedded as a digital watermark on a recording medium and ejects the recording medium (step S105). The transmitter 12 transfers the printed image data and the meta data to the server device 2 (step S106).

The user is able to add a correction by handwriting to the printed recording medium and re-scans the recording medium. In this case, the read controller 14 of the image processing apparatus 1 executes scanning of the recording medium according to the instruction. The detector 15 then detects the identifying information that is embedded as the digital watermark from the read image (step S115). The read controller 14 creates image data of the read image (step S116). The read controller 14 gives identifying information (a document ID) that is detected at step S115 to the image data (step S117). The read controller 14 creates, for example, meta data like that illustrated in FIG. 8 (step S118). The read controller 14 generates the image data in which the document ID is embedded as a digital watermark (step S119). The transmitter 12 transfers the generated image data and the meta data to the server device 2 (step S120).

The receiver 21 of the server device 2 receives the image data and the meta data that are transmitted at step S106 and step S120. The server device 2 then executes the following process.

The determining unit 23 determines whether the same document as the received document (image) is in the storage unit 27 (step S107). For example, the determining unit 23 determines whether the same document ID as the document ID contained in the meta data is stored in the storage unit 27. When there is not the same document ID (NO at step S107), the storage controller 24 saves the image data and the meta data that are received in the storage unit 27 (step S108). When there is the same document (YES at step S107), the storage controller 24 replaces the image stored in the storage unit 27 in association with the document ID with the transmitted image and saves (updates) the image (step S109).

The search unit 25 then searches for a document that relates to the saved document in the search unit 25 (step S110). The generator 26 determines whether the relative document is existed (step S111). When the related document is existed (YES at step S111), the generator 26 generates a link to the related document (step S112).

After creating the link to the relative document, when the relative document is not existed (NO at step S111), the generator creates a link to the saved document (image) (step S113). The generator 26 generates a mail contain ng the created link and distributes the mail to, for example, the user who creates (corrects) the document (step S114). The mail address of the user may be specified with reference to, for example, the user information in which the user name and the user address are associated with each other.

Figure 11:
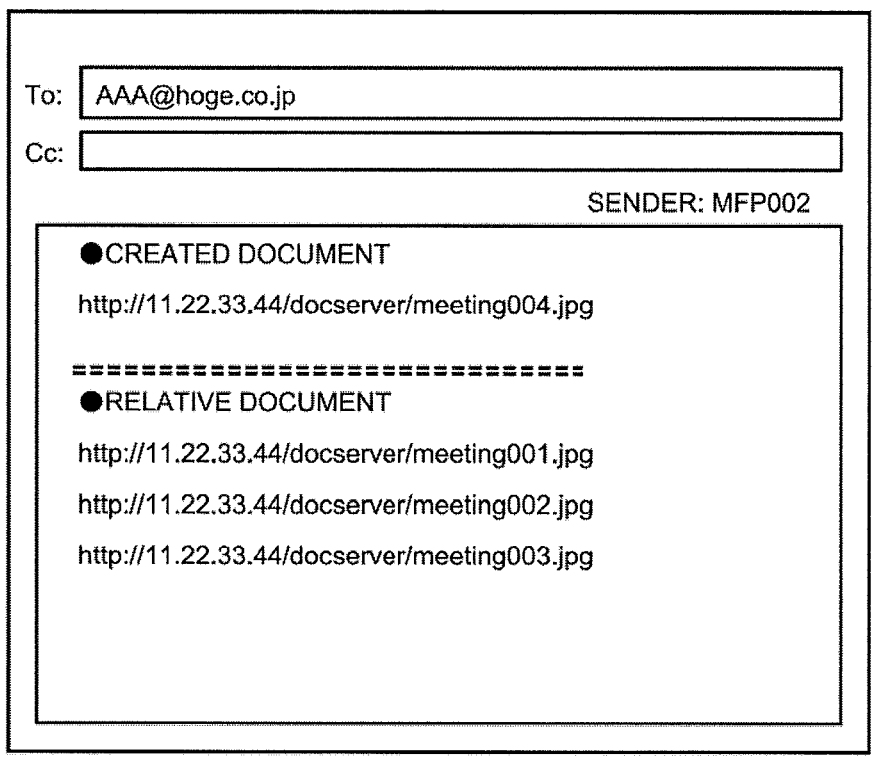
FIG. 11 is a diagram of an exemplary mail to be distributed.

FIGS. 10 and 11 are diagrams of an exemplary mail to be distributed. FIG. 10 illustrates an exemplary mail representing that a document is made viewable in association with another system (such as document management software) that manages the document. Clicking the link in the mail enables an access to the relative document. Information, such as the document name and the creator, may be displayed in the link.

FIG. 11 illustrates an exemplary mail representing that a document is made viewable in association with, for example, a file server that stores the document. A file pass (positional information) representing the position in which the document is stored in the file server is displayed in the link. As illustrated in FIG. 10, it is possible to make the document viewable without preparing special software that manages the document.

As described above, according to the embodiment, the identifying information that is embedded by, for example, digital watermarking is detected when the image is corrected by handwriting and the image is re-scanned and, when the detected identifying information is already stored in the server device, the image corresponding to the stored identifying information is updated with the re-scanned image. Accordingly, an operation to choose a document to be updated is unnecessary and the processing load of updating information is reducible.

A program that is executed by the apparatus according to the embodiment is incorporated in, for example a ROM and provided.

The program that is executed by the device according to the embodiment may be configured to be recorded in an installable form or an executable file in a computer-readable recording medium, such as a CD-ROM, a flexible disk (FD), a CD-R or a digital versatile disk (DVD), and to be provided as a computer program product.

Furthermore, the program that is executed by the device according to the embodiment may be configured to be stored in a computer that is connected to a network, such as the Internet, and to be downloaded via the network to be provided. The program that is executed by the device according to the embodiment may be configured to be provided or distributed via network, such as the Internet.

The program that is executed by the device according to the embodiment has a module configuration including the above-described components. As practical hardware, the CPU (Processor) reads the program from the ROM and executes the program and accordingly the components are loaded into the main storage device and the components are stored in the main storage device.

According to the embodiment, there is an effect that it is possible to reduce the processing load of updating information.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system, comprising:
a server device; and
an image processing apparatus comprising:
   a read control circuit configured to:
      read a recording medium on which a first image is formed and in which first identifying information of the first image is embedded,
      generate a second image including the first identifying information embedded within the second image, and
      delete the first image from the recording medium;
   a detector configured to detect the first identifying information embedded in the second image; and
   a first transmitter configured to transmit the first identifying information and the second image to the server device,
the server device comprising:
   a storage configured to store an image and second identifying information of the image in association with each other;
   a determining circuit configured to determine whether the first identifying information is stored in the storage; and
   a storage control circuit configured to, when the determining circuit determines that the first identifying information is stored in the storage, store the second image in the storage in association with the second identifying information.

2. The information processing system according to claim 1, wherein the server device further comprises a second transmitter configured to transmit a relative image that relates to the image stored in the storage in association with the first identifying information.

3. The information processing system according to claim 2, wherein the second transmitter transmits link information representing a link to the relative image.

4. The information processing system according to claim 2, wherein the second transmitter transmits positional information representing a position in which the relative image is stored.

5. The information processing system according to claim 2, wherein the second transmitter transmits the relative image to at least one transmission destination that is determined according to the relative image.

6. The information processing system according to claim 2, wherein the second transmitter transmits the relative image to a user who has authority to access the relative image.

7. The information processing system according to claim 1, wherein when the determining circuit determines that the first identifying information is stored in the storage, the storage control circuit replaces the image associated with the second identifying information with the second image.

8. The information processing system according to claim 1, wherein when the determining circuit determines that the first identifying information is stored in the storage, the storage control circuit does not delete the image associated with the second identifying information and additionally stores the second image in association with the second identifying information.

9. An information processing method, comprising:
reading, by an image processing apparatus, a recording medium on which a first image is formed and in which first identifying information of the first image is embedded;
generating by the image processing apparatus a second image including the first identifying information embedded within the second image;
deleting, by the image processing apparatus, the first image from the recording medium;
detecting by the image processing apparatus, the first identifying information embedded in the second image;
transmitting, by the image processing apparatus, the first identifying information and the second image to a server device;
storing, by the server device, an image and second identifying information of the image in association with each other in a storage;
determining, by the server device, whether the first identifying information is stored in the storage; and
storing, by the server device when the server device determines that the first identifying information is stored in the storage, the second image in the storage in association with the second identifying information.

\* \* \* \* \*